May 30, 1939.  A. D. WILEY ET AL  2,160,048
UNIVERSAL WELDING HEAD
Filed May 14, 1937  2 Sheets-Sheet 1
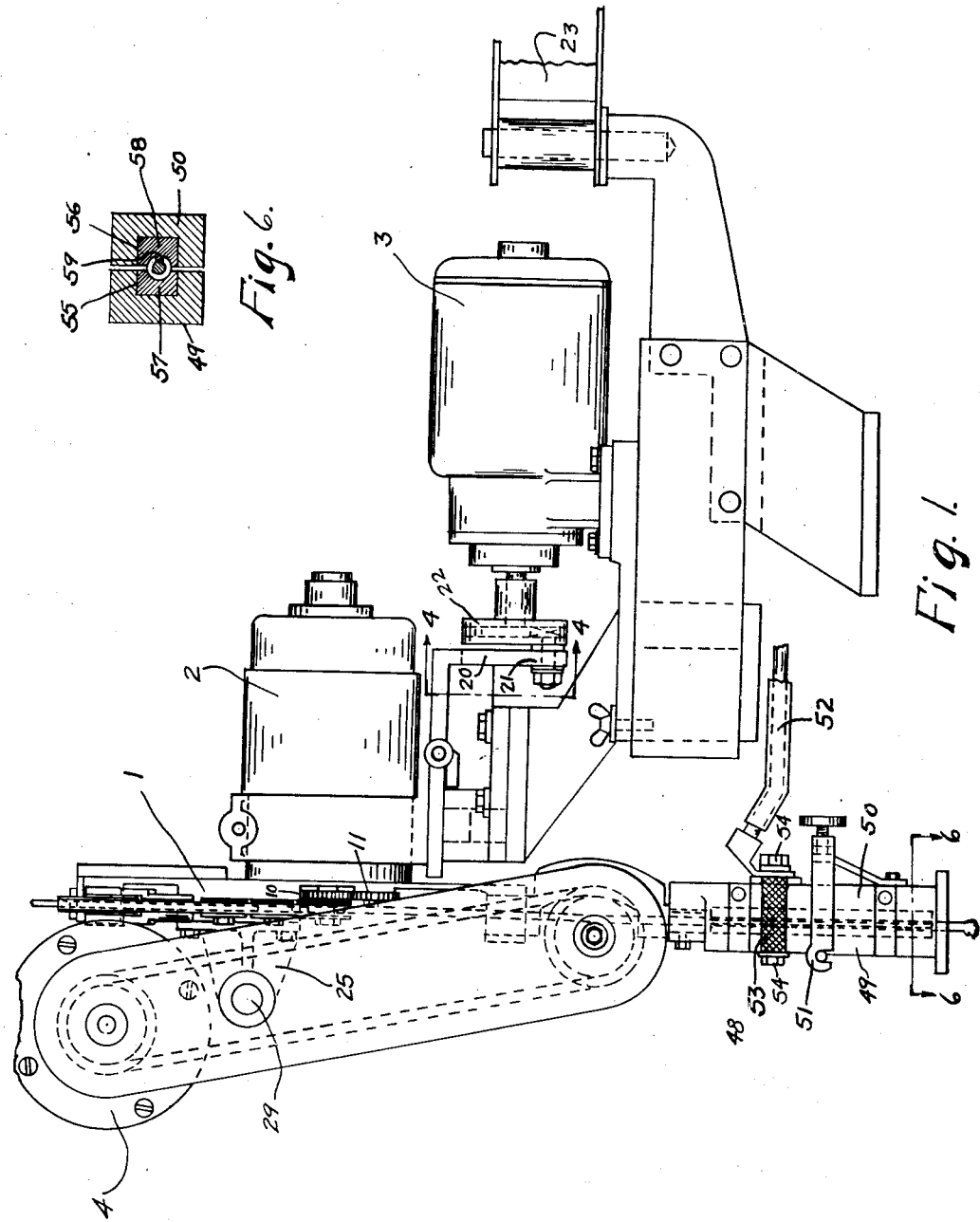
INVENTORS.
ALLEN DALE WILEY
AND WILLIAM H. FRANZMANN.
BY Allen & Allen
ATTORNEYS.

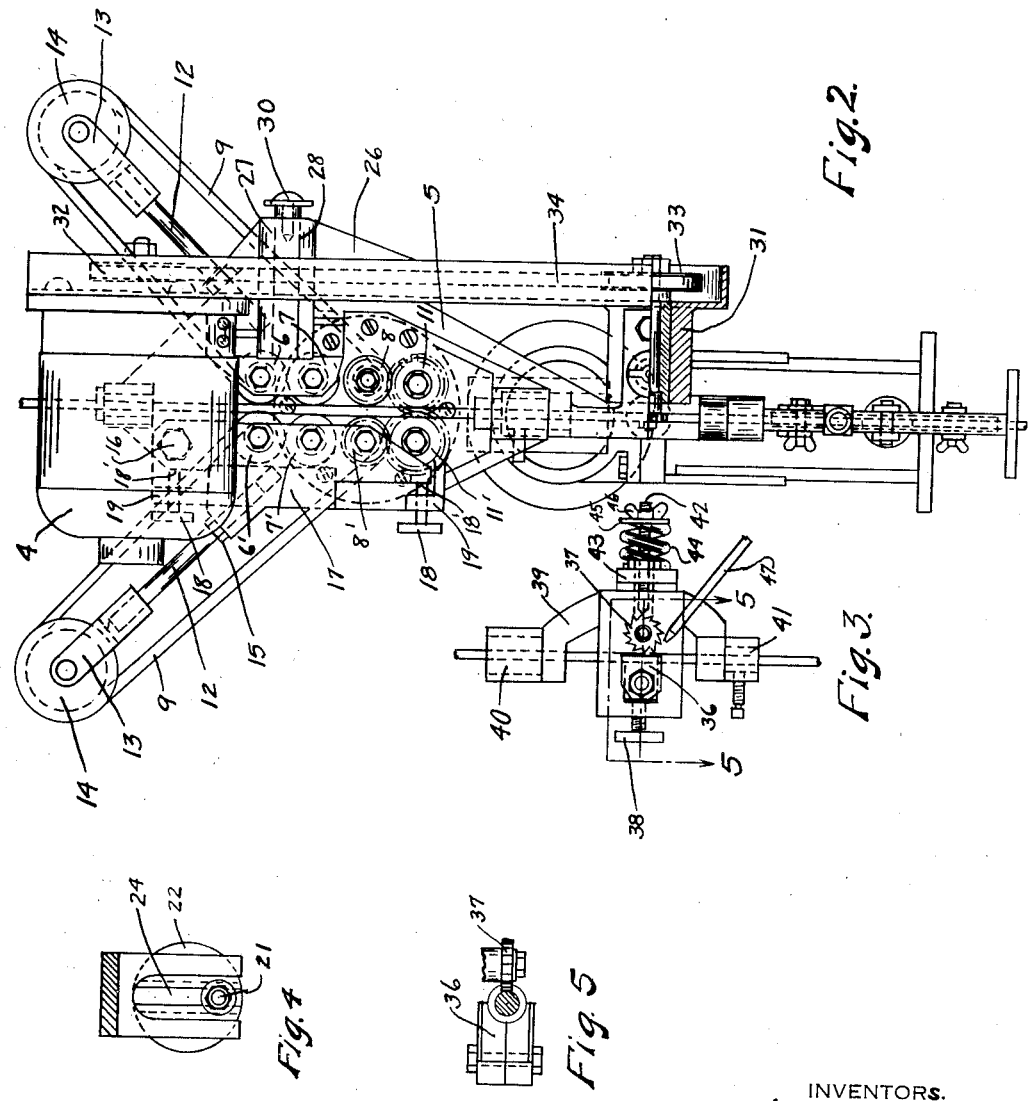

Patented May 30, 1939

2,160,048

UNITED STATES PATENT OFFICE 2,160,048

UNIVERSAL WELDING HEAD

Allen Dale Wiley and William H. Franzmann, Middletown, Ohio, assignors to The American Rolling Mill Company, Middletown, Ohio, a corporation of Ohio Application May 14, 1937, Serial No. 142,680

5 Claims. (Cl. 219—8)

This invention relates to a universal welding head useful in connection with automatic electrical welding machines.

There is on the market a considerable number of welding machines designed for use with certain kinds of welding rods. These machines generally are satisfactory when using the particular welding rod for which the machine is designed. It is frequently necessary, however, or desirable, to change from one type of welding rod to another, such as, for example, from a bare rod to a coated rod. It has been our experience that a machine which is designed for use with bare rods is absolutely unsatisfactory for use with coated rods and vice versa, and it is therefore an object of our invention to provide a universal welding head which may be efficiently used with any type of welding rod now available on the market.

In the use of coated welding rod difficulty has been encountered in that the coating is extremely brittle and may easily become broken or chipped off. It is therefore necessary to provide a feeding means for the rod which, while it will adequately grip the rod to feed it without slippage, will not injure the coating thereon. It is therefore another object of our invention to provide a novel feeding means equally adapted for use with coated or uncoated welding rods which will feed the rods efficiently and yet which will not in any way injure the coating.

When coated rods are used it is necessary to provide for making contact with the rod material through the coating. For this purpose milling cutters have been used in the past. It is, however, extremely important that the slot milled in the coating by the milling cutter be of uniform depth and uniformly on center so as to make for uniform good contact by the contact bar, whereby flash-overs and complete destruction of the contactor unit are avoided. In this connection it is an object of our invention to provide a milling attachment for a welding head which will insure uniform depth and centering of the contact slot regardless of the position assumed by the welding wire during a welding operation.

It is desirable in electric welding that the contact with the welding wire be established as near the tip as possible so as to reduce the current carrying length of the welding wire to a minimum. It is therefore an object of our invention to provide a welding head in which the feeding device is relatively far removed from the region of the weld, while the contacting element is extremely close to the point of the weld.

In certain types of welding it is desirable to oscillate the arc back and forth across the seam and means have been provided in the past for performing this operation. So far as we are aware, however, it has been the practice to oscillate only the welding tip. We have provided means whereby the feeding motor and the feeding means are oscillated in unison with the welding tip which results in a simpler and more efficient welding head. In oscillating a welding electrode across a relatively wide seam, it is essential that the movement of the electric arc should be retarded somewhat at the end of each swing across the seam and it is an additional object of our invention to provide oscillating means which produce such a period of repose at the end of each swing of the welding electrode. These and other objects which will be described hereinafter or will be apparent to one skilled in the art upon reading these specifications, we accomplish by that certain construction and arrangement of parts of which we shall now describe an exemplary embodiment. Reference is made to the drawings which form a part hereof and in which Fig. 1 is a side view of a welding head and attachments in accordance with our invention.

Fig. 2 is an end view of the same as seen from the left of Fig. 1 with the milling arbor support in cross section.

Fig. 3 is a detailed partial side view showing how the milling cutter engages the welding wire.

Fig. 4 is a cross sectional view taken on the line 4—4 of Fig. 1.

Fig. 5 is a cross sectional view taken on the line 5—5 of Fig. 3.

Fig. 6 is a cross sectional view through the contact device taken on the line 6—6 of Fig. 1.

Briefly in the practice of our invention, we provide a feeding device indicated generally at 1 in Fig. 1. 2 indicates a motor and speed reducer for driving the feeding device 1. A motor for actuating the oscillating device is indicated at 3 and the milling motor is shown at 4.

The feeding device 1 consists generally of a plate 5 which is mounted by any conventional means on the motor. This plate carries the pulleys 6, 7 and 8 around which the V belt 9 passes. Mounted on the same shaft with the pulley 8 is a gear 10 which meshes with the motor pinion 11. Thus the rotation of the motor 2 is imparted through the gear train 11, 10 to the pulley 8 which becomes the belt driving pulley.

A rod 12 having a forked end 13 in which is mounted the pulley 14 is screwed into the member 5 and is provided with a lock nut 15 whereby the tension in the belt 9 may be adjusted. Adjustably mounted upon the member 5 by means of a bolt 16 is an adjustable plate 17. This plate carries a series of pulleys 6', 7' and 8'. As was described above in connection with the pulley 8 the pulley 8' has a gear mounted on the same shaft with it similar to the gear 10 which meshes with a gear 11' driven by the motor corresponding to the gear 11. These elements are not shown in the drawings but it is understood that they are in all respects similar to the gears 10 and 11. The member 17 also carries a rod 12 having a forked member 13 upon which is mounted a pulley 14 and which is adjustable by means of a lock nut 15, as above described for adjusting the tension in the V belt 9. The adjustment of the plate 17 carrying the left hand driving element is accomplished by means of thumb screws 18 mounted in lugs 19 on the plate 5 bearing against portions of the plate 17 at 18'. It is understood that the bolt 16 is fixed in the plate 5 and passes through a horizontal slot in the plate 17 and that its function is primarily to support the plate 17 in its proper position.

It will thus be seen that our feeding means comprise a pair of V belts which we prefer to make of some insulative material such as a rubber, or fiber composition, and which bear against a welding rod on both sides over a considerable portion of its length. There is no slippage between the V belt and the pulleys and by virtue of the long contact between the V belts and the welding wire there is no slippage at this point either. It will further be noted that contrary to conventional construction, the electrical contact with the welding wire is not made by the feeding means at all, but is made adjacent the point of weld as will be described hereinafter.

The feeding motor 2 is mounted for reciprocation in a line perpendicular to the plane of the drawing in Fig. 1 or in what would be a horizontal line in the plane of the paper in Fig. 2. This may be done by any conventional means. Integral with the base of the motor is an arm 20 adapted to receive the eccentric pin 21 mounted on the member 22 which is driven through a gear reducer by the motor 3. It will be clear that as the member 22 turns, the arm 20, carrying with it the motor 2 and the entire feeding device, will reciprocate back and forth. This may best be understood by reference to Fig. 4. The frequency of oscillation may of course be adjusted by means of the rheostat of the motor 3 which is mounted on a control panel, part of which is seen at 23 in Fig. 1. The amplitude of oscillation may be adjusted by an adjustment of the throw of the pin 21 in any conventional manner. In order to provide for a period of repose at the end of each swing back and forth across the seam, we have made the slot 24 in the arm 20 wider than the pin 21 so that at the end of each stroke there is a small amount of backlash which must be taken up by rotation of the member 22 thus providing a period of rest where it is required.

We will now describe the milling attachment which is used with coated wire or rod. The member 5 carries a boss 25 upon which we mount the milling attachment. This attachment comprises a frame member 26 having a boss 27 provided with a bore 28 which is slipped over a stub shaft 29 mounted in the boss 25. The frame member is held in place by any conventional means, indicated at 30. At the upper end the frame member 26 carries a milling motor 4 and at its lower end it carries the milling arbor support 31. The drive is transmitted from the motor 4 to the milling cutter by means of the pulleys 32 and 33 and a belt 34. With reference to Figs. 3 and 5 it will be noted that a guide block 36 is provided for backing up the milling cutter 37. The guide block 36 is adjustable by means of the thumb screw 38.

Referring particularly to Fig. 3 the means we have provided for insuring perfectly centered and constant depth slot milling comprise a C-shaped member 39 having the guide blocks 40 and 41 at its respective ends. The member 39 is resiliently mounted on the milling arbor support 31 by means of a pin 42 mounted in the member 31 and passing through a hole in a lip 43 which is integral with the member 39. A spring 44 at one end bears against the member 43 and at the other end against a washer 45. The tension of the spring is adjustable by means of the wing nut 46. By virtue of the swingable mounting of the milling attachment indicated at 27, 28, 29, 30 it will be seen that as the welding wire or rod sways back and forth, the member 39 will be caused to follow it and by virtue of the resilient construction indicated at 42, 43, 44, 45, 46, will cause the milling arbor support 31 to swing with it about the pivot 29. If desired in certain classes of welding, we may provide an air blast by means of a nozzle indicated generally at 47.

Referring again to Fig. 1 a contact device is indicated generally at 48. It comprises a housing composed of two parts 49 and 50 which surround the welding wire and are held together by means of a clamping arrangement indicated generally at 51. The bus 52 is clamped to the member 48 and to a braided contact element 53 by means of the bolts 54. Referring to Fig. 6 which represents a cross section taken on the line 6—6 of Fig. 1, it will be seen that the members 49 and 50 are provided with the recessed seats 55 and 56 respectively. The actual contact bars are adapted to be held in the seats. The particular set of contact bars shown in Fig. 6 at 57 and 58 are designed for use with a coated wire which has to be milled. It will be noted that the element 57 has a semi-circular inner surface, while the member 58 is provided with a key-like member 59 which is adapted to enter the slot milled in the welding wire to make contact with the base material. It is understood that other contact bars 57 and 58 having standard external dimensions will be provided and that these contact bars will have inner surfaces designed for use with the various types of welding wire now on the market.

It will thus be seen that we have provided a universal welding head which is adapted equally for use with straight or reeled welding wire of any dimensions and of any manufacture, whether coated or not, and that we have provided for oscillation of the electrode with proper periods of repose at the end of each stroke, that we have provided a feeding device relatively far removed from the weld and contacting device immediately adjacent the weld. We have also provided a milling attachment in which the milling motor is relatively far removed from the weld so that it is not subject to the intense heat and the smoke and flying globules of welding material which are ordinarily encountered, so that the operating life of the milling motor is greatly increased. Furthermore, it will be seen that we have provided a milling attachment which insures perfect slot milling so that absolute uniformity of welding contact is maintained.

It is to be understood that modifications may be made without departing from the spirit of our invention and that we do not intend to limit ourselves otherwise than as pointed out in the claims which follow.

Having now described our invention, what we believe is new and desire to secure by Letters Patent, is:

1. An oscillating electric welding head comprising a frame, a feeding motor mounted on said frame for reciprocal movement, and means for oscillating said head as a unit by causing reciprocating movement of said feeding motor.

2. An oscillating electric welding head comprising a frame, a feeding motor mounted on said frame for reciprocal movement, a feeding device for welding rod attached to said frame, and means for oscillating said head as a unit comprising a slotted lip attached to said feeding motor, and a second motor provided with a crank having a pin engaging in the slot in said lip.

3. In combination with an electric welding head having a frame, a milling device pivotally mounted on said frame, said milling device comprising a motor at the end farthest removed from the region of the welding operation, a milling cutter at the end thereof nearest to the region of the welding operation, transmission means between said motor and said cutter, backing up means for the welding rod opposite said milling cutter, and means for insuring properly centered and constant depth milling comprising a member resiliently mounted on said milling device adjacent the milling cutter and provided with arms having guide members for said welding rod above and below said milling cutter.

4. An electric welding head comprising a device having only a feeding function, said device comprising a series of pulleys and V-belts made from non-conducting material running on said pulleys, said pulleys being arranged to provide parallel flights of said belts over a substantial length of the welding rod being fed, and means for driving at least a pair of said pulleys and a contacting device, said contacting device being located relatively near the welding area and said feeding device being relatively far removed therefrom.

5. An electric welding head according to claim 4, in which the set of pulleys for carrying one of said V-belts is adjustable in parallelism with the other set which is fixed.

ALLEN DALE WILEY.
WILLIAM H. FRANZMANN.